June 13, 1950     T. S. HOOPINGARNER ET AL     2,511,265
AIRCRAFT WING MOUNTING
Filed June 30, 1947     3 Sheets-Sheet 1
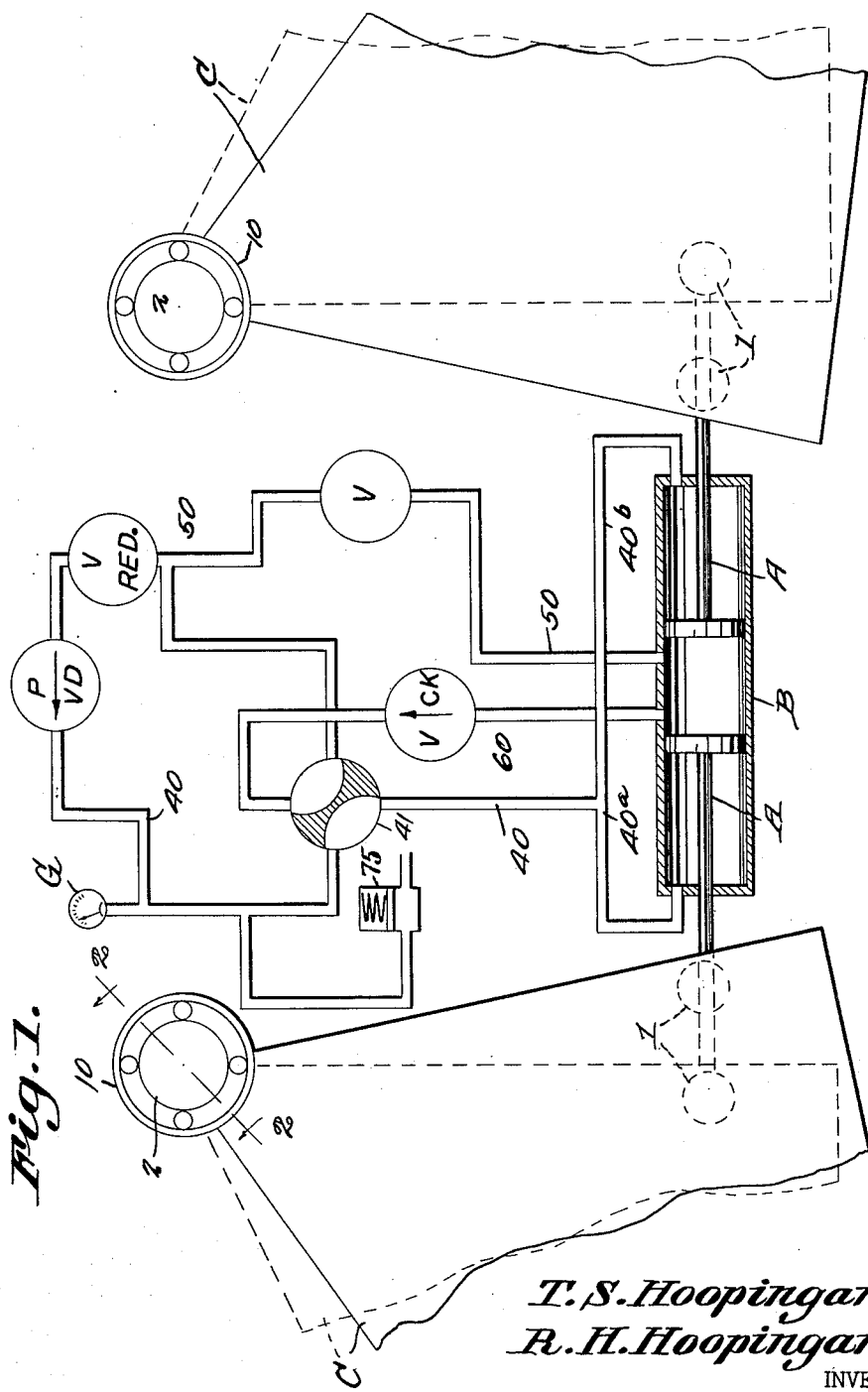
T. S. Hoopingarner
R. H. Hoopingarner
INVENTORS

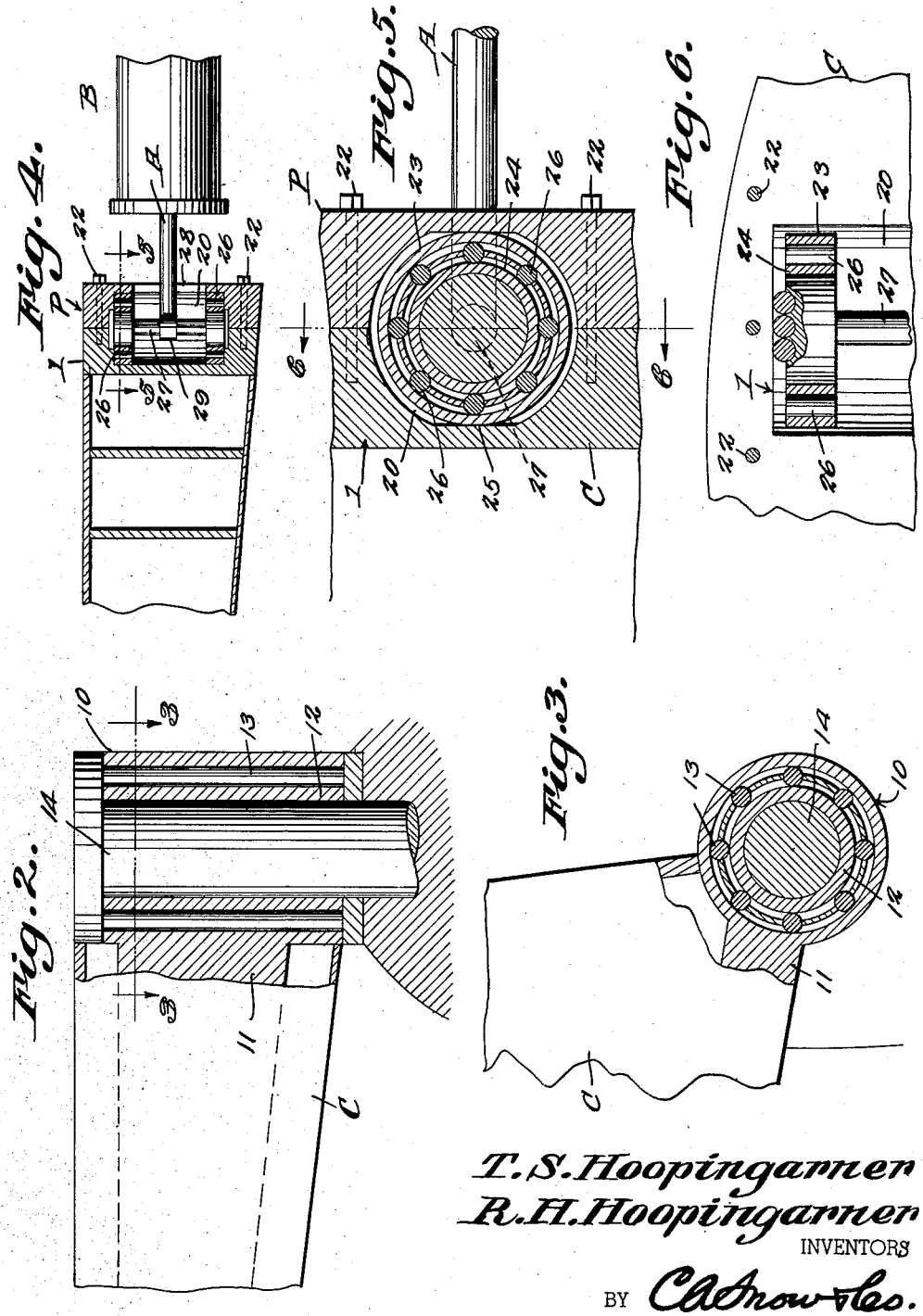

June 13, 1950 T. S. HOOPINGARNER ET AL 2,511,265
AIRCRAFT WING MOUNTING
Filed June 30, 1947 3 Sheets-Sheet 3

T. S. Hoopingarner
R. H. Hoopingarner
INVENTORS
BY C. A. Snowles.
ATTORNEYS.

Patented June 13, 1950

2,511,265

UNITED STATES PATENT OFFICE 2,511,265

AIRCRAFT WING MOUNTING

Thomas S. Hoopingarner and Ralph H. Hoopingarner, Glenwood Springs, Colo.

Application June 30, 1947, Serial No. 758,102

3 Claims. (Cl. 244—46)

This invention relates to new and improved aircraft wing mountings and more particularly and specifically to variable adjustment wing mountings of which the following is a specification.

It is an aerodynamic fact that very thin airfoils tend to delay the action of compressibility. It is likewise a well known phenomena that compressibility occurs first, not at the wing root, but somewhere between the tips and the root, depending upon the curvature of the airfoil. Therefore, the root, although the thickest geometrically, is not the thickest aerodynamically. This is partly due to the fact that the root offers very little leverage for the air to act upon.

Radical sweep-back is one way of helping to solve this problem. However, all fixed wing craft of this type has proven very difficult to handle at low speeds.

One object of the variable sweep-back wing is to delay still further this action of compressibility away from the wing root and in such a manner as to dampen the shock through a liquid medium so that it is conservatively estimated that the plane may have passed safely through the danger range by the time the wing has completely stopped its back-sweep, for as is clearly shown, the pilot may choose to start the sweep-back at very high speeds or may, by a simple valve selection, choose to let the air itself shape the angle of sweep-back.

Another and more widely demanded use of the variable sweep-back wing is to allow planes of lighter horsepower to attain greater speeds through lessened forward resistance.

A still further demand for the back-sweep is to provide all airplanes a suitable shock-dampening wing mount, to lessen strain, both mechanical and physical, encountered in rough air, and to allow more adequate means of storage by lessening the total wing span.

The primary object of this invention resides in the provision of an improved wing mounting for aircraft which adapts them for variable back-sweep action through the desired scope.

Another object of this invention lies in the provision of an improved hydraulic system adapted for cooperation with said wing mountings to enable the operator to quickly, easily and positively control the sweep actuation of the wings by means of valve and switch operation.

Still another object of this invention is the provision of such a control system which acts to control both wings of an aircraft in unison to maintain the stability and good characteristics thereof at all times, and a system which may be selectively placed in such a condition as to allow the air pressure to control the sweep of the wings automatically.

Still further improvements and advantages of this invention will readily appear to those skilled in the art when the following description is read in the light of the accompanying drawings in which:

Fig. 1 is a plan view of the preferred hydraulic system.

Fig. 2 is a vertical section taken on line 2—2 of Fig. 1.

Fig. 3 is a horizontal section taken on line 3—3 of Fig. 2.

Fig. 4 is a vertical section of the wing hinge means.

Fig. 5 is a horizontal section taken on line 5—5 of Fig. 4.

Fig. 6 is a vertical section taken on line 6—6 of Fig. 5.

Figure 7:
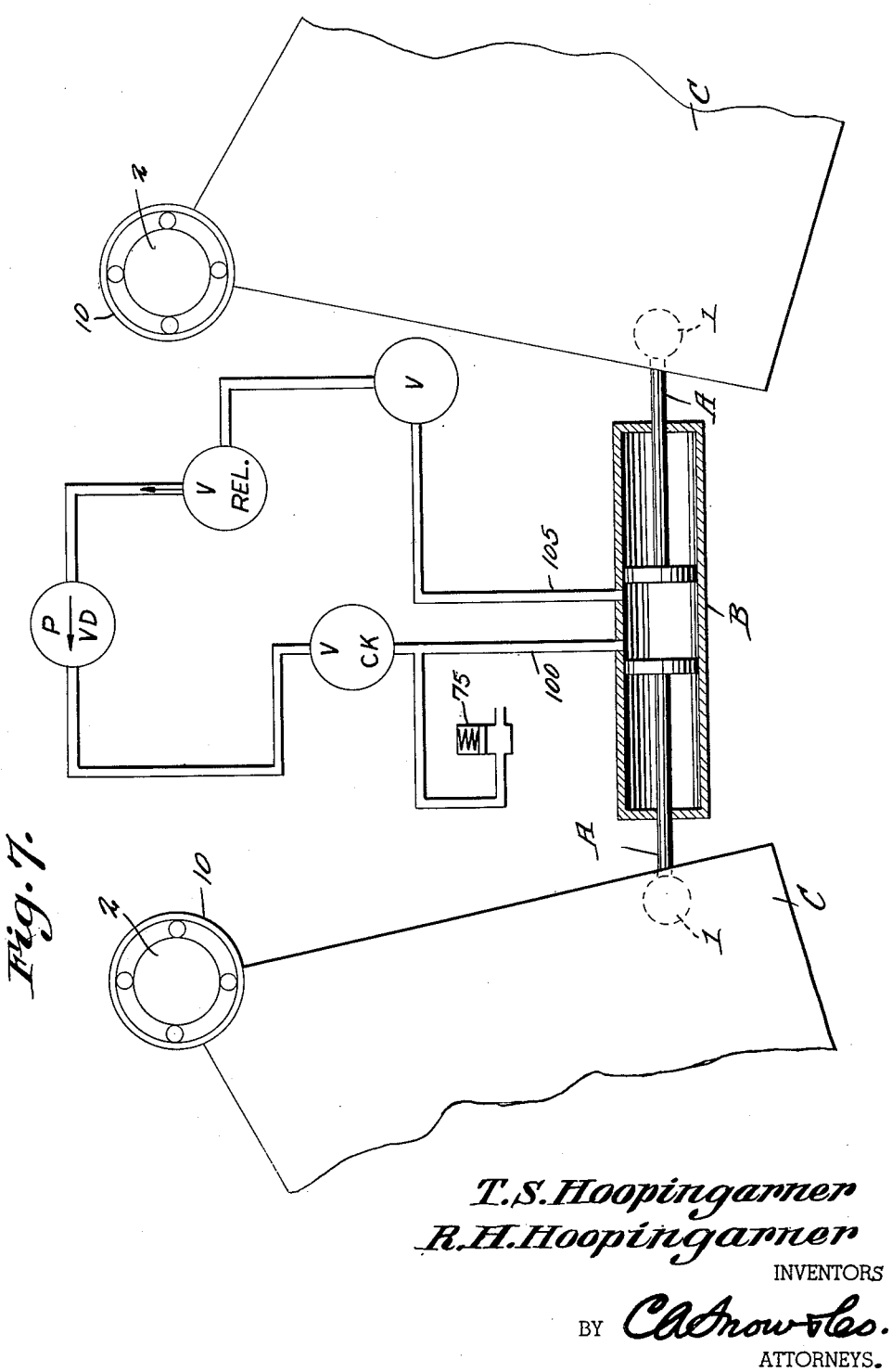
Fig. 7 is a plan view of a modified hydraulic control system.

It is to be understood that I contemplate any modifications in this invention such as size, materials used, and general characteristics which fall within the scope of the appended claims.

Referring now to the accompanying drawings which illustrate the preferred embodiment of this invention and in which like numerals indicate similar parts throughout the construction is as follows.

Fig. 1 illustrates the preferred arrangement for a hydraulic control system for the variable wings. The hydraulic system, to be described later, is selectively controlled to actuate a pair of power plungers A mounted in opposition within, and each extending outwardly from opposite ends of, a hydraulic cylinder B.

The outer extremity of each of the plungers A is mounted in a ball type joint I within the trailing root edge portion of the two adjacent wings C which are rotatably mounted to the plane at the root end of their leading edges, as at 2.

The hinge assembly 2 rotatably mounting the leading root end of the wing to the plane, illustrated in section in Figs. 2 and 3 comprises a cylindrical roller bearing housing 10 formed integrally with the main forward spar 11 of the wing C, at the root end thereof, which extends vertically the depth of the wing C. The housing contains a second cylindrical housing 12, concentrically disposed therein, which is supported vertically from the plane body. A plurality of spaced roller bearings 13 are spaced between the two housing structures permitting the easy rotation of the outer wing formed housing 10 about the plane supported housing 12. A headed hinge pin 14 is inserted inward the inner cylindrical housing to a secured position within the plane structure, with the head thereof overlying both cylinders and completing an airfoil surface upon the wing skin, thus securely hinging said wing to the craft.

The ball socket joint 1, by which the plungers A are secured in a substantially horizontal plane to the trailing root portions of the wings C, comprises, in the singular, as illustrated in Figs. 4, 5, and 6, a cylindrical chamber 20 formed vertically in the wing at a point adjacent the root edge and near the trailing edge thereof, formed equally within the wing C and within a plate member P bordering the root edge of the wing and removably secured thereto by a plurality of tie studs 22. A pair of concentric collars 23 and 24 are mounted within each end of the chamber 20, the outer collar 23 being secured in place, as at 25, and the inner collar rotating within the roller bearings 26 spaced thereabout and within the outer collar.

A double headed pin 27 is mounted within the chamber 20 with each head thereof carried within one of the two opposed rotating cylinders 24, thus permitting the rotation of the pin within the chamber 20 and the wing C.

The extended arm of the plunger A passes through a provided opening 28 in the wing edge plate 21, into the chamber 20, where it is secured, as at 29, to the pin 27.

Thus it may be seen from Fig. 1 that operation of the hydraulic system to actuate the plungers A inward and outward selectively will cause rotation of the wing about the hinge assembly 2, as illustrated in dotted line, for the purposes, objects and advantages set forth herein.

The preferred embodiment of the hydraulic system, as illustrated in Fig. 1 embodies the following parts, and operation and function thereof.

Assuming the wings C are positioned as shown in solid line, a variable capacity pump PVD is selectively operated to pump a hydraulic fluid through the line 40, past the pressure gage G, and through the two way valve 41 to the twin branches 40a and 40b which conduct the fluid equally to the cylinder B without each of the plungers A forcing them inward and moving the wings C to position indicated in dotted line, or to any predetermined position intermediate. During this operation the fluid disposed between the plungers flows through the line 50, the shut-off valve V, and restrictor valve V.RED to the pump P.

It is pointed out at this time that by the use of a large line at 50, and a variable restrictor valve at V.RED, the return flow of the liquid to the pump may be increased or decreased controlling the speed of the wing sweep change.

The pressure accumulator indicated by the reference character 75 is installed in the pipe line and compensates for surges in the main hydraulic system, due to sudden changes in pressure, temperature or elements which would cause a pressure change.

However, it is to be understood that the variable capacity pump P/VD which forces fluid through the system will, under ordinary conditions, adequately take care of the changes of pressure.

To again extend the wings to their original extended position, in dotted line, the valve 41 is turned allowing the flow of liquid through line 60 and check valve V CK to the center of the cylinder B, and by closing the return valve V a pressure increase causes the extension of the plungers and hence the wings.

By shutting down the pump and merely using the valve control the air pressure will actuate the fluid, through the wings and the plungers, at the will of the operator as if the pump power were applied.

The hydraulic system shown as a modification in Fig. 7 comprises a simpler circular system having a variable capacity pump P.VD which forces fluid through the line 100, and through a check valve VCK to the center of the cylinder B thus forcing the wings to their extended position.

When it is desired to retract the wings a valve V on a return line 105 to the pump is opened which allows the liquid to move up to a relief valve V.REL before the pump. The relief pressure of this valve is selectively variable to permit the retraction of the wings at a predetermined air pressure thereon.

To again extend the wings the valve V is again closed increasing the pressure within the cylinder thus forcing the plungers A outwardly.

Thus it may be seen that an improved wing assembly has been provided with a powered actuating hydraulic system therefor, as well as an air operated automatic hydraulic system.

Having thus described and explained the construction and function of this invention what we desire to claim in Letters Patent is:

1. A variable sweep-back wing assembly for aircraft and control means therefor comprising, a vertically disposed roller bearing hinge horizontally pivoting the leading root edge of the wings to the aircraft, a hydraulic cylinder disposed intermediate said wings, a pair of opposed power plungers extending from said cylinder, pins vertically rotatably supported within wing cavities adjacent the trailing root edges thereof, means securing the extended ends of said plungers to said pins, a selectively operable hydraulic system for extending and retracting said plungers in the manner and for the purpose described.

2. A construction as defined in claim 1 wherein, said hydraulic system comprises a variable capacity pump for supplying fluid centrally to said cylinder, a return line from said central cylinder to said pump, a shut-off valve on said return line, an adjustable pressure relief valve after said shut-off valve on said line, and means permitting the opening of said shut-off valve to allow the relief valve to pass fluid to said pump from said cylinder when the air pressure on said wings reaches a predetermined point for the purpose described.

3. A construction as defined in claim 1 wherein, said hydraulic system comprises, a variable capacity pump, a feed line, a two-way valve on said feed line, a common feed line from said valve to the outer portions of said cylinder, a second line from said valve to the central portion of said cylinder, a return line from said valve to said pump, a return line from said central cylinder to said pump, a restrictor valve common to both of said return lines, and means adapting the selective operation of said two-way valve and said restrictor valve to permit the selective introduction and exhaust of fluid from the end and central portions of said cylinder in the manner described to extend or retract said wings for the purpose described.

THOMAS S. HOOPINGARNER.
    RALPH H. HOOPINGARNER.

REFERENCES CITED

The following references are of record in the file of this patent:

UNITED STATES PATENTS

| Number | Name | Date |
|---|---|---|
| 1,545,553 | Dillingham | July 14, 1925 |
| 1,759,442 | Depew | May 20, 1930 |
| 1,868,417 | Hill | July 19, 1932 |
| 2,074,897 | Everts | Mar. 23, 1937 |
| 2,293,644 | Gluhareff | Aug. 18, 1942 |
| 2,428,934 | Gille et al. | Oct. 14, 1947 |